Jan. 1, 1963  J. DUBOUCHET  3,070,963
AUTOMATIC GATE FOR MAINTAINING A CONSTANT
AND ADJUSTABLE WATER LEVEL
Filed July 16, 1959  3 Sheets-Sheet 1

INVENTOR.
JACQUES DUBOUCHET

BY
*Corey, Hart & Stemple*

ATTORNEYS

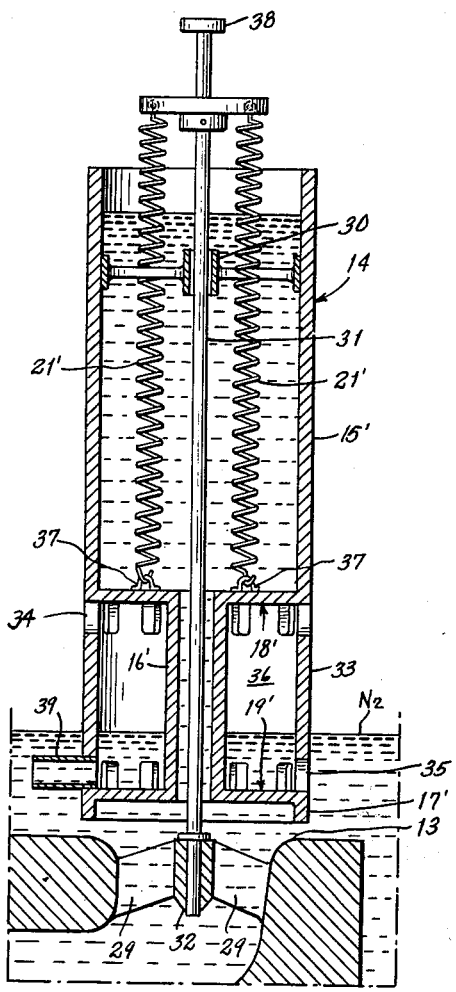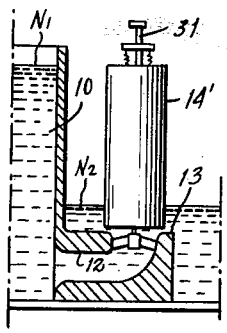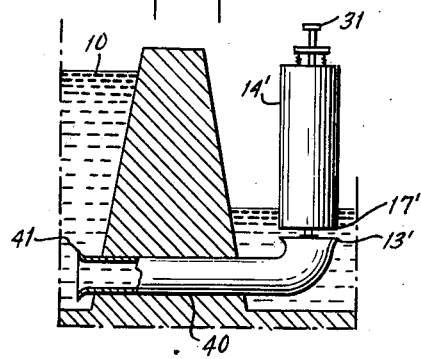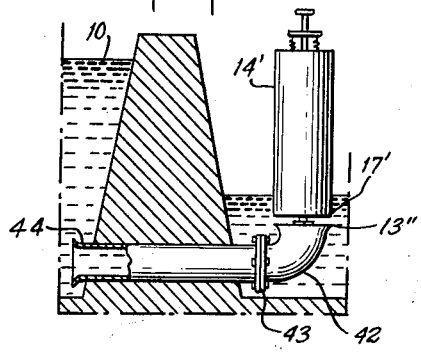

Jan. 1, 1963
J. DUBOUCHET
3,070,963
AUTOMATIC GATE FOR MAINTAINING A CONSTANT
AND ADJUSTABLE WATER LEVEL
Filed July 16, 1959
3 Sheets-Sheet 3

INVENTOR.
JACQUES DUBOUCHET

BY Corey, Hart & Stemple

ATTORNEYS

United States Patent Office 3,070,963
Patented Jan. 1, 1963

3,070,963
AUTOMATIC GATE FOR MAINTAINING A CONSTANT AND ADJUSTABLE WATER LEVEL
Jacques Dubouchet, Birmandreis, Algeria, assignor to Etablissements Neyrpic, Grenoble, France, a corporation of France
Filed July 16, 1959, Ser. No. 827,536
Claims priority, application France July 21, 1958
20 Claims. (Cl. 61—23)

The present invention relates to automatic gates for controlling the level of a reach of water and has for its principal object the provision of an automatic gate of simple construction adapted for use in irrigation networks to maintain a constant and adjustable level in the water reach on the downstream side of the gate.

In accordance with the foregoing object, the invention contemplates providing a gate having the closing member constituted of a hollow cylinder which is open at both ends and which is constructed with a restricted portion of such shape and size that when the gate is suitably set in a water level to be adjusted on the downstream side thereof, the closing member is subjected to a thrust which depends on the downstream level but is independent of the upstream level.

The gate further includes a device of simple construction, for instance a spring or a counterweight, adapted to compensate for each position of the closing member, the thrust exerted by the water on said closing member and to satisfy conditions of the relationship which is to bind the opening of said closing member with the water level. The device is furthermore adapted to adjust the gate at the start for any predetermined downstream level.

The gate of the invention is located in the water reach to be controlled in such a manner that the aforesaid restricted part of the closing member lies in registry with the level thereof to be adjusted. In operation, the gate which is arranged to control the flow of water through a passageway into such reach, increases the discharge opening of such passageway and consequently the rate of water flowing therethrough whenever the level of the reach sinks with reference to a predetermined datum line corresponding to the initial adjustment of the gate. On the other hand, the gate decreases the discharge opening of such passageway and consequently the rate of water flowing therethrough whenever said reach level to be adjusted rises. The gate of this invention thus maintains the water level of the reach being controlled at any desired predetermined height within predetermined limits, whatever may be the upstream level or the water flow admitted into the downstream reach of water.

For an understanding of the details of construction of the gate of this invention reference is made to the following description which should be read in connection with the accompanying drawings, wherein FIG. 1 is a diagrammatic view showing the arrangement of a gate according to the invention relative to a conduit or passageway through which water is supplied to the reach of water to be controlled;

FIG. 4 is a vertical sectional detail view of a preferred embodiment of a gate constructed in accordance with the invention;

FIG. 5 is a view somewhat like FIG. 1 showing on a smaller scale the manner in which the gate of FIG. 4 may be permanently positioned along the edge of a canal;

FIGS. 6 and 7 are views similar to FIG. 5 and show two methods of mounting the gate of FIG. 4 so that it may be readily dismountable for frequent shifting from one point to another;

Figure 1:
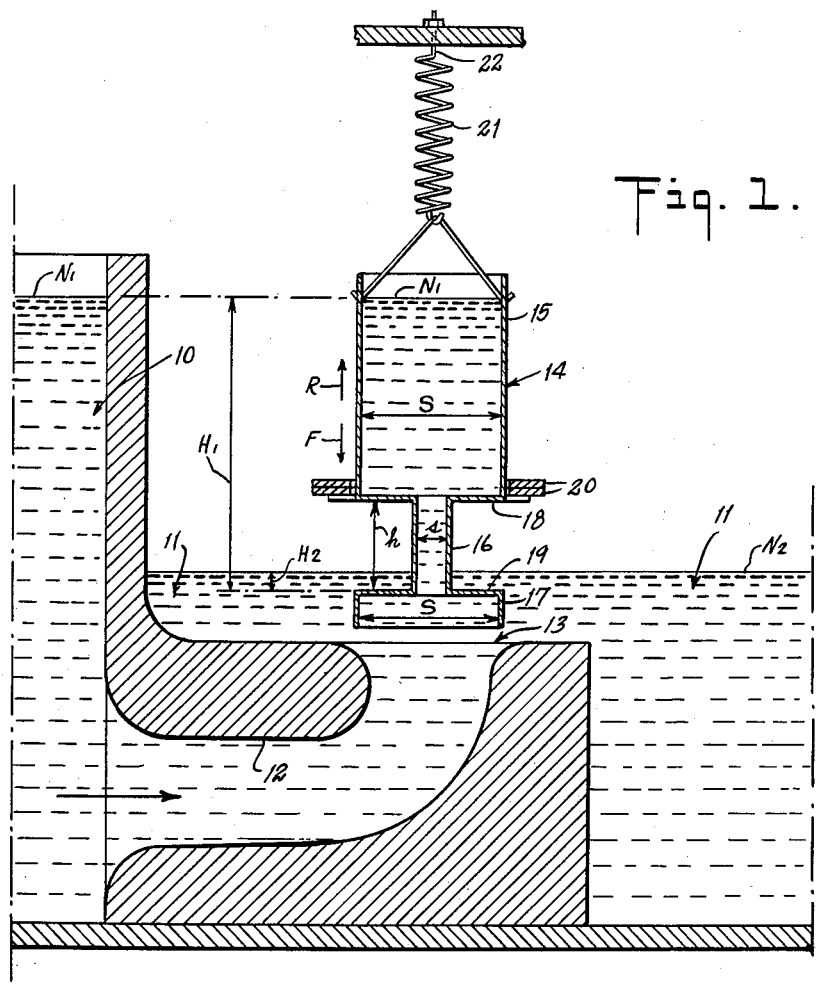

Referring now more particularly to FIG. 1 of the drawings, the numeral 10 indicates generally an upstream reach of water having a variable level $N_1$. Water from the upstream reach 10 feeds through a conduit or passageway 12 to a downstream reach of water 11 having a level $N_2$ which it is desired to maintain at a substantially constant height regardless of any fluctuations in the upstream water level $N_1$. This is accomplished through a gate indicated generally by the numeral 14 and adapted to move vertically relative to a seat formed at the outlet end 13 of the conduit 12. The outlet end 13 provides a liquid admission into the downstream reach 11 and extends horizontally so that the flow of water therethrough may be readily controlled by the vertically movable gate 14.

In accordance with the invention, the gate 14 is constituted of a vertically disposed tubular body having an upper section 15 and a lower section 17, both of which sections have the same uniform cross-sectional area S. The two sections 15 and 17 are disposed in spaced relation and are interconnected by in intermediate restricted section 16, the reduced cross-sectional area of which is indicated by the reference letter $s$ and the height of which is indicated by the letter $h$. The horizontal transverse walls 18 and 19 connect the lateral walls of the restricted section 16 respectively with the lateral walls of the upper section 15 and of the lower section 17, and form the bottom and top walls, respectively, of such sections 15 and 17.

The upper section 15 forms a capacity which is sufficiently high that its upper edge will overtop the level $N_1$ even when the gate is closed and the level $N_1$ is at a maximum, and that its lower wall 18 will be positioned below the level $N_1$ even when the gate is open and the level $N_1$ is at a minimum. The intermediate restricted section 16 is adapted to be immersed in the upper portion of the water reach 11 and its position in such reach and its height $h$ are so selected that the level $N_2$ of such reach will never rise normally up to the upper section 15 or sink normally down to the lower section 17 of the gate. The lower section 17 forms the actual closing member cooperating with the seat 13.

The hydraulic thrust to which the gate 14 is subjected acts vertically on the horizontal walls 18 and 19, the areas of which are similar and equal to the difference of the cross-sectional area S and the cross-sectional area $s$, or $S-s$. Designating by $H_1$ and $H_2$, respectively, the vertical distances between the upstream level $N_1$ and the downstream level $N_2$, respectively, and the lower horizontal wall 19, it is apparent that wall 19 is subjected to an upwardly directed hydraulic thrust $H_1(S-s)$ and to a downwardly directed hydraulic thrust $H_2(S-s)$, while wall 18 is subjected only to a downwardly directed hydraulic thrust $(H_1-h)(S-s)$. The vertical resultant R of the hydraulic thrusts exerted on the gate 14 is therefore directed upwardly and has for its value:

$$R = h(S-s) - H_2(S-s)$$

It will be observed that this resultant R is independent of $H_1$, i.e. of the upstream level $N_1$. It is to be further noted that the resultant R is larger when $H_2$ is smaller and vice-versa.

The gate 14 is also subjected to an outer vertical force F constituted partly by the actual weight of the gate. The force F is directed downwardly so as to equilibrate the upwardly directed hydraulic thrust R as shown by the equation:

$$F = R = h(S-s) - H_2(S-s)$$

Equilibrium may thus be obtained for a level $N_2$ and an opening of the gate for which $H_2$ satisfies the conditions defined by the above equation. This condition of equilibrium has a tendency to be maintained because, if the downstream level were to rise for any reason whatever above the adjusted level $N_2$, the height $H_2$ would increase and, consequently, the downwardly directed thrust would become predominant over the external force F, thereby causing a closing of the gate and consequently cutting down on the feed of water to the reach 11 until the level of the latter has returned to $N_2$. Inversely, if the downstream level were to sink below the adjusted level $N_2$, the height $H_2$ would decrease and, consequently, the upwardly directed force would become predominant and cause an opening of the gate to overfeed the water reach 11 until the level of the latter has returned to $N_2$.

However, such a system is unstable and has an operation of the make-and-break type because the forces producing the movements do not cancel out, but on the contrary, increase as the movements are being executed.

It has been found that a stable operation may be obtained by making the force F vary as a function of the vertical movements of the gate and, more particularly, by making it decrease when the gate sinks towards its seat 13. There is thus provided a compensation for the modifications in the hydraulic thrust R which decreases when the gate sinks towards seat 13.

If such a variation of the force F is smaller than the corresponding variation of the thrust R, the operation remains a make-and-break operation which is however made advantageously smooth.

If, on the other hand, the variation of the force F is as large as, or larger than the modification in the thrust R, this leads to a stable operation. In the first case the level decrement is zero, when the downstream level has the desired height, the gate may present any extent of opening since the force exerted by the spring 21 for instance secures equilibrium in any position. In the second case the level is regulated with a decrement.

Figure 2:
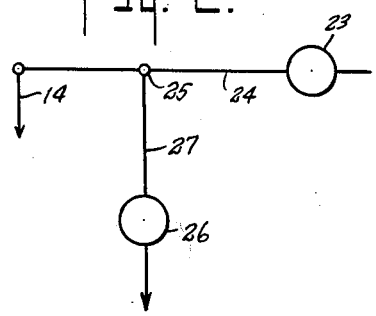
FIG. 2 shows diagrammatically a modified form of the means which controls the gate and which is constituted of a system of levers and counterweights instead of the elastic means shown in FIG. 1, said system being shown in FIG. 2 in a position corresponding to the opening of the gate.
Figure 3:
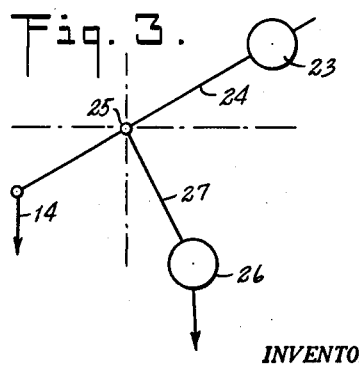
FIG. 3 is a view similar to FIG. 2 showing the relation of the parts in the gate controlling system when the gate is in closed position.

Any suitable method of controlling the variation of the force F during the movements of the gate 14 may be utilized through any suitable means, such as for instance, the spring 21 in FIG. 1 or the auxiliary counterweight 26 in FIGS. 2 and 3 fitted on a rocking rod 27 so that the operative lever arm thereof varies at a great extent with the movements of the gate 14. As is shown in FIG. 1, the spring 21 which is of a suitable setting and of sufficient stiffness, is vertically disposed and depends from a point of attachment 22, the lower end thereof being connected in any suitable manner to the upper section 15 of the gate. Thus increased tension will be placed on the spring as the gate moves toward the closed position. The rocking rod 27 in FIGS. 2 and 3 is mounted on a beam 24 so that both rock around a fixed pivot point 25. The gate 14 is pivotally connected to one end of an arm of beam 24 in any suitable manner and is balanced by a counterweight 23 mounted on the other arm of beam 24. Furthermore, the level $N_2$ to be regulated may be modified by changing the initial force F. The force F may be readily adjusted through any suitable means, as for instance, by the auxiliary weights 20 in FIG. 1 which may be added to or removed from the gate, by modifying the mean stress of the spring 21 through adjustment of its attachment point 22, by changing the position of counterweight 23 in FIG. 2 on beam 24, by providing a counterweight 23 which may be adjustably weighted, or by a combination of any number of such means or equivalent means. The counterweights 23 and 26 which are adjustably positioned on the beam 24 and lever arm 27, respectively, may be made adjustable as to their magnitude, by means for instance of removable capacities. It is also within the contemplation of the invention to replace these two counterweights by a single counterweight which is adjustable as to position and/or magnitude.

Reference is now made to FIGS. 4 and 5 of the drawings which show a preferred construction of gate embodying the principles illustrated by the above described gate 14. It will be noted that the gate shown in FIGS. 4 and 5 has a simple and compact construction which is devoid of pivots and pivotal connections, the closing member or body 14' thereof being slidably mounted for movement in a vertical direction. The gate body 14' slides vertically on a vertical rod 31 fitted at its lower end in a sleeve 32 supported by radial fins 29 mounted inside the circular outlet opening 13 which communicates with the channel or tank having the variable level $N_1$. The gate body 14' is slidably engaged with the rod 31 through a guide member 30 which is supported axially within the upper body section 15' of the gate. The gate body 14', like the gate body 14, includes an upper tubular section 15', an intermediate reduced section 16' and a lower section 17', the three sections being connected together by the horizontal transverse walls 18' and 19'. These parts are substantially similar in constructional arrangement and function to the parts 15–19 of the gate 14 and operate in a similar manner. The restricted section 16' of the gate body 14' is surrounded by a spaced circular wall 33 which forms an extension of the walls of the larger diameter sections 16' and 17' of the gate body. The outer circular wall 33 is provided at its upper end with a plurality of openings 34 which adjoin the upper wall 18' connecting the restricted section 16' to the upper tubular section 15' and is provided at its lower end with a plurality of openings 35 which adjoin the lower wall 19' connecting such restricted section to the lower tubular section 17'. The circular wall 33 is constructed to enable it to maintain within the annular space 36 formed between it and the peripheral wall of the restricted section 16', a level of water which registers with the downstream level $N_2$ and which is protected against any possible irregular disturbances in the downstream reach. With a view to producing inside the annular space 36 a level which is identical with the downstream level $N_2$ and which will be unaffected by the hydrodynamic effects provided by the flow of water in the vicinity of the ports 35, it may be preferred in certain cases to provide such ports 35 with outwardly projecting radial pipes 39 capable of bringing the space 36 into communication with a calmer area of water in the downstream reach which is not subjected to the action of the water flow.

In the gate 14' as in the previously described gate 14, suitable compensation of the thrust is secured by means of a spring arrangement. In the gate 14', however, two springs 21' are employed and such springs are located within the upper tubular section 15' of the gate body. Each of the springs 21' is secured at its lower end by an anchoring loop 37 to the upper wall 18' and is secured at its upper end to an outer end of a supporting member 38 slidably mounted on the rod 31 and adjustably secured thereto. Thus the slider 38 enables adjustment of the height of the points of attachment of the springs 21' with a view of defining the height of the adjusted level $N_2$. The stiffness of the springs 21' defines the law which binds the opening of the closing member to the water level $N_2$.

In the construction shown in FIGS. 4 and 5 the gate 14' is secured to the outlet opening 13 and forms part of a permanent installation. FIG. 6 shows the gate 14' utilized as part of a movable, readily transportable apparatus fitted transiently along the edge of a canal with a view to flooding under predetermined conditions a section of cultivated ground. The apparatus includes two separate parts, on the one hand, the gate 14' and, on the other hand, a pipe 40 fitted in the bank of the canal. The outer end 41 of the pipe 40 forms an intake for the water while its other end 13' is formed to provide a circular seat for the lower section 17' of the closing member of gate 14'. The rod 31 is supported on the outlet end 13' of pipe 40 in a manner similar to that shown with respect to the outlet opening 13 in FIGS. 4 and 5.

FIG. 7 shows a modification of the movable apparatus illustrated in FIG. 6. In this modification, the gate 14' is shown associated with a pipe 42 somewhat similar to pipe 40 in FIG. 6 but formed of two pieces which are connected together by a flange coupling 43. One piece of the pipe 42 forms as precedingly a seat 13" for the lower section 17' of the closing member of gate 14', while the other piece provides an intake pipe 44 opening into the upstream canal 10.

In the modified form of gate 14" shown in FIGS. 8 and 9 of the drawings, the arrangement of the parts thereof is substantially similar to that described with reference to the gate construction 14' shown in FIGS. 4 and 5 and such parts operate in substantially the same manner as the parts of the gate 14'. Gate 14" differs from gate 14' principally in the fact that the guide 30 and spring support 38 of the latter are eliminated and the central rod 31' thereof has a threaded upper part 45, with which is threadedly engaged a transverse bar 46 that serves as the attaching means for the compensating springs 21". The lower ends of the springs 21" are attached to the wall connected to the upper end of the restricted section 16" in the same manner as the springs 21' of gate 14'. The bar 46 is rotatably fixed, but is freely translatable vertically with relation to the cylindrical outer wall of the gate 14" because of two vertically disposed, inwardly projecting ribs 47 formed of folded metal welded along two diametrically opposed generating lines of the outer wall and slidably engaging the ends of the bar 46 so as to guide the latter in its vertical movements. It will be understood that these movements will be brought about by turning the body of the gate 14" in one direction or the other on the central rod 31' so as to produce a variable rising or sinking movement of the bar 46. Thus, with this construction it is possible to modify very simply and as desired the stress of the springs 21" and, thereby, the height at which the downstream level $N_2$ is to be adjusted.

The gate 14" is also provided with two lateral handles 48 which are secured in diametrically opposed relation to the tubular wall of the body thereof and which facilitate the transportation and the setting in position of the gate and the ready execution of the hereinabove referred to adjustment of the springs 21".

The gate 14" is closed at its upper end by a cap 49 having a central threaded hub member 50 which is screwed on the top of the central rod 31'. The cover 49 is provided with a lateral wall 51 for guiding the upper end of the gate body in its vertical movements, while its central section at the place indicated by the numeral 52 as an abutment which defines the end of the gate opening movement. The embodiment of FIG. 8 also illustrates modified forms of openings 34' and 35' in the wall portion 33' which forms with the wall of the restricted section 16", the inner chamber 36'.

Figure 8:
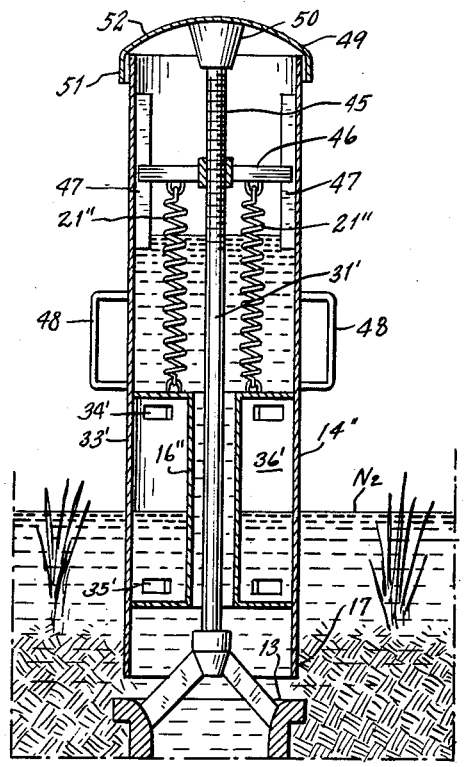
FIG. 8 is a view similar to FIG. 4 and illustrates a modified form of the gate structure.
Figure 9:
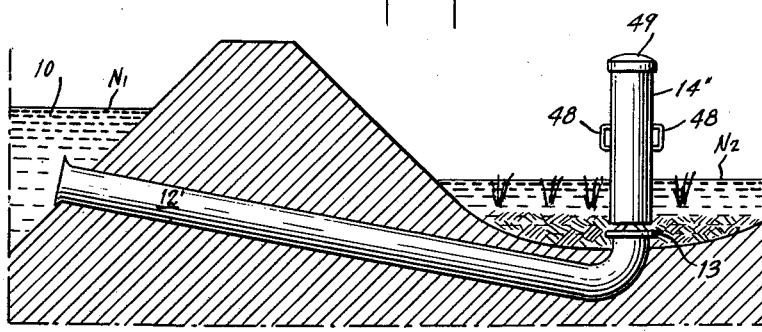
FIG. 9 is a diagrammatic view showing how the gate of FIG. 8 may be fitted along a canal to irrigate a field at a constant adjustable level.

It will be noted from the above descriptions of the different embodiments illustrated in FIGS. 1 to 9 of the drawings, that the gate of this invention provides a means for maintaining the downstream level $N_2$ at a desired constant and adjustable value, whatever may be the modifications of the level $N_1$ in the feeding canal or upstream reach of water and whatever may be the modifications in the water flow passing through the gate to the downstream reach. It will also be obvious that the gate is readily adaptable to many different situations where such a control may be advantageous. Thus, the gate may be applied in a particularly interesting manner for certain cultures in the practice of which it is necessary to provide a reach at a constant level fed by a variable upstream level, whatever may be the water flow required, while it is desirable furthermore to adjust the water level from time to time so as to follow the growth of the vegetation. Such an installation for the growing of rice and utilizing the gate construction shown in FIG. 8, is illustrated in FIG. 9 of the drawings. Among the other numerous applications of use of the gate of this invention is as a controlling gate at the outlet end of a filtering tank.

While I have hereinabove described and illustrated preferred embodiments of my invention, it will be apparent to those skilled in the art that various modifications and changes may be made therein without departing from the scope of the accompanying claims.

I claim:

1. An automatic gate for controlling the flow of liquid through a passageway connecting an upstream reach with a downstream reach so as to maintain constant the level of liquid in such downstream reach, comprising a vertically disposed closing body having an upper section, a lower section, a reduced section intermediate said upper and lower sections and having a cross-sectional area transverse to the vertical axis of said closing body substantially less than the transverse areas of said upper and lower sections said upper section being provided with a liquid chamber which normally extends upwardly from a level above the level of the downstream reach and substantially below the level of the upstream reach to a height above the latter, and which has a bottom wall providing a transverse area substantially greater than said transverse area of said reduced section and through the center of which passes said vertical axis, means bringing said chamber into communication with the liquid in said upstream reach to provide in such chamber a liquid mass having a liquid level conforming to the level of the upstream reach, said lower section being wholly immersed in the liquid of said downstream reach to control the discharge of the liquid from said passageway into the downstream reach, said lower section having a transverse area subjected to hydraulic thrust of said reaches substantially equal to the area of said chamber bottom wall and through the center of which passes said vertical axis, said intermediate section being partly immersed in the liquid of such downstream reach and being of a height greater than the normal rise and fall of the level of said downstream reach, and said upper section being positioned above the level of said downstream reach and being of such height that its upper end and the transverse bottom wall of said chamber associated therewith will be above and below, respectively, the normal rise and fall of the level of said upstream reach, and means for supplying a force in opposition to a resultant of the hydraulic forces on said transverse walls of said closing body.

2. An automatic gate for controlling the flow of liquid from an upstream reach to a downstream reach so as to maintain constant the level of liquid in such downstream reach, comprising a passageway connecting said upstream reach with said downstream reach, and having a substantially horizontally disposed discharge opening to be located below the level of said downstream reach, a vertically disposed closing body positioned adjacent to and controlling said horizontally disposed discharge opening and having an upper section, a lower section, a reduced section intermediate said upper and lower sections and having a cross-sectional area transverse to the vertical axis of said closing body substantially less than the transverse areas of said upper and lower sections said upper section being provided with a liquid chamber which normally extends upwardly from a level above the level of the downstream reach and substantially below the level of the upstream reach to a height above the latter, and which has a bottom wall providing a transverse area substantially greater than said transverse area of said reduced section and through the center of which passes said vertical axis, means bringing said chamber into communication with the liquid in said upstream reach to provide in such chamber a liquid mass having a liquid level conforming to the level of the upstream reach, said lower section being wholly immersed in the liquid of said downstream reach to control the discharge of the liquid from said passageway into the downstream reach, said lower section having a transverse area subjected to hydraulic thrust of said reaches substantially equal to the area of said chamber bottom wall and through the center of which passes said vertical axis, said intermediate section being partly immersed in the liquid of such downstream reach and being of a height greater than the normal rise and fall of the level of said downstream reach, and said upper section being positioned above the level of said downstream reach and being of such height that its upper end and the transverse bottom wall of said chamber associated therewith will be above and below, respectively, the normal rise and fall of the level of said upstream reach, means for supporting said closing body for vertical movement toward and away from the discharge opening of said passageway, and means for supplying a force in opposition to a resultant of the hydraulic forces on said transverse walls of said closing body.

3. An automatic gate for controlling the flow of liquid through a passageway connecting an upstream reach with a downstream reach so as to maintain constant the level of liquid in such downstream reach, comprising a vertically disposed closing body having an upper section, a lower section, a reduced section intermediate said upper and lower sections and having a cross-sectional area transverse to the vertical axis of said closing body substantially less than the transverse areas of said upper and lower sections, said upper section being provided with a liquid chamber which normally extends upwardly from a level above the level of the downstream reach and substantially below the level of the upstream reach to a height above the latter, and which has a bottom wall providing a transverse area substantially greater than said transverse area of said reduced section and through the center of which passes said vertical axis, means bringing said chamber into communication with the liquid in said upstream reach to provide in such chamber a liquid mass having a liquid level conforming to the level of the upstream reach, said lower section being wholly immersed in the liquid of said downstream reach to control the discharge of the liquid from said passageway into the downstream reach, said lower section having a transverse area subjected to hydraulic thrust of said reaches substantially equal to the area of said chamber bottom wall and through the center of which passes said vertical axis, said intermediate section being partly immersed in the liquid of such downstream reach and being of a height greater than the normal rise and fall of the level of said downstream reach, and said upper section being positioned above the level of said downstream reach and being of such height that its upper end and the transverse bottom wall of said chamber associated therewith will be above and below, respectively, the normal rise and fall of the level of said upstream reach, and compensating means for balancing the hydraulic forces on said transverse walls of said closing body in each position of the latter and for controlling the extent of the opening of the gate.

4. A gate according to claim 3, wherein said compensating means comprises an elastic system of suitable stiffness and connected with the closing body so as to balance the thrust of the hydraulic forces thereon.

5. A gate according to claim 3, wherein said compensating means comprises a lever and counterweight system the torque of which is variable with the travel of the gate.

6. A gate such as defined in claim 1, including means for subjecting said closing body to a mechanically applied vertical force of such magnitude as to maintain said downstream reach at a given level.

7. A gate such as defined in claim 6, including means for modifying said force means to modify the given level of said downstream reach.

8. A gate according to claim 4, wherein the elastic system is connected at one end to said closing body and is connected at its other end to an adjustable point of attachment.

9. A gate according to claim 3, wherein said compensating means includes auxiliary weights removably mounted on said closing body.

10. A gate such as defined in claim 2 in which said supporting means includes a central carrier rod extending through said closing body, a member adjustably mounted on said rod, and an elastic system connected at one end to said closing body and connected at its other end to said adjustable member.

11. A gate such as defined in claim 10, including a support member for said carrier rod centrally located within the discharge opening of said passageway, and means for supporting said support member in such position relative to such discharge opening.

12. A gate according to claim 4, including a central carrier rod extending through said closing body and an attachment member threadedly engaging said rod within the upper section of said closing member, said elastic system being connected at one end to said closing body and at its other end to said attachment member, and means mounted on the upper section of said closing member and engaging said attachment member to prevent rotative movement thereof relative to said upper section but to permit vertical adjustment with respect thereto, whereby adjustment of the point of attachment of the elastic system is accomplished by rotating said closing body around said carrier rod.

13. A gate according to claim 12, including a cover screwed on the upper end of said carrier rod and formed to serve both as a guide for the upper end of the gate body and as a top defining the maximum opening of the gate.

14. A gate according to claim 5, wherein the said system comprises a lever connected to said closing body in supporting relation and a counterweight mounted on said lever and constructed to enable the operative lever arm thereof to be varied.

15. A gate according to claim 1 including an outer perforated wall enclosing the intermediate reduced section of the closing body and forming an extension of the outer walls of the remaining sections of the gate, said outer perforated wall and wall of said reduced section forming an annular chamber within which is formed a level conforming to the level of the downstream reach.

16. A gate such as defined in claim 2, in which said passageway is constituted of a pipe having one end formed to provide an intake for the liquid in the upstream reach and its other end upturned to form said horizontally disposed discharge opening, said supporting means supporting said closing body on said upturned pipe end.

17. A gate according to claim 1, including guide means associated with said guide body for defining the vertical movements thereof.

18. An automatic gate for controlling the flow of liquid through a passageway connected at one end to an upstream reach and discharging at its other end into a downstream reach located below the level of said upstream reach and so as to maintain constant the level of liquid in such downstream reach, the discharge end of such passageway being defined by a horizontally disposed discharge opening located below the level of the downstream reach so that the liquid from such upstream is discharged vertically upwardly into the liquid of the downstream reach, said gate comprising a vertically disposed closing body located adjacently above said horizontal opening so as to be located in the liquid upwardly discharged therefrom, said closing body having an upper section forming a liquid receptacle, a lower section, and a section intermediate said upper and lower sections of reduced cross-sectional area to provide transverse walls at the junctures thereof with said upper and lower sections, said transverse walls being of equal area and the upper transverse wall at the upper end of said reduced section constituting the bottom wall of the receptacle formed by said upper section, a liquid passage through said lower and intermediate sections and through said upper transverse wall for bringing the interior of said upper section into communication with the liquid upwardly discharged from said discharge opening and enabling such liquid to maintain in the interior of said upper section a liquid level conforming to the level of the upstream reach, said lower section being wholly immersed in the liquid of said downstream reach to control the discharge of the liquid from said passageway into the downstream reach, said intermediate section being partly immersed in the liquid of such downstream reach and being of a height greater than the normal rise and fall of the level of said downstream reach, and said upper section being positioned above the level of said downstream reach and being of such height that its upper end and the transverse wall associated therewith will be above and below, respectively, the normal rise and fall of the level of said upstream reach, and means for supplying a force in opposition to a resultant of the hydraulic forces on said transverse walls of said closing body.

19. An automatic gate for controlling the flow of liquid through a passageway connected at one end to an upstream reach and discharging at its other end into a downstream reach located below the level of said upstream reach and so as to maintain constant the level of liquid in such downstream reach, the discharge end of such passageway being defined by a horizontally disposed discharge opening located below the level of the downstream reach so that the liquid from such upstream reach is discharged vertically upwardly into the liquid of the downstream reach, said gate comprising a vertically disposed closing body located adjacently above said horizontal opening so as to be located in the liquid upwardly discharged therefrom, said closing body having an upper tubular section, a lower tubular section, a reduced tubular section intermediate said upper and lower sections, and transverse walls of equal area connecting the ends of said reduced section with the associated ends of said upper and lower sections, said upper section forming with said upper transverse wall a liquid receptacle, and said transverse walls having openings therein at the ends of said reduced intermediate section so that said intermediate and lower sections form a liquid passage bringing the interior of said upper section into communication with the liquid upwardly discharged from said discharge opening and enabling such liquid to maintain in the interior of said upper section a liquid level conforming to the level of the upstream reach, said lower section being wholly immersed in the liquid of said downstream reach to control the discharge of the liquid from said passageway into the downstream reach, said intermediate section being partly immersed in the liquid of such downstream reach and being of a height greater than the normal rise and fall of the level of said downstream reach, and said upper section being positioned above the level of said downstream reach and being of such height that its upper end and the transverse wall associated therewith will be above and below, respectively, the normal rise and fall of the level of said upstream reach, and means for supplying a force in opposition to a resultant of the hydraulic forces on said transverse walls of said closing body.

20. An automatic gate for controlling the flow of liquid through a passageway connected at one end to an upstream reach and discharging at its other end into a downstream reach located below the level of said upstream reach and having a discharge end defined by a substantially horizontally disposed discharge opening located below a given level of the downstream reach so that the liquid from such upstream is discharged substantially vertically upwardly into liquid of the downstream reach above such discharge opening, said gate comprising a substantially vertically disposed gate closing body located over said discharge opening so as to be disposed in the liquid upwardly discharged therefrom, said closing body having an upper section provided with a liquid chamber which normally extends upwardly from a level above the level of the downstream reach and substantially below the level of the upstream reach to a height above the latter, and which has a bottom wall providing a substantial area transverse to and through the center of which passes the vertical axis of said closing body, and said closing body having in vertically aligned relation to said upper section, a lower section and a reduced section intermediate said upper and lower sections, said lower section having a wall disposed in spaced relation to and equal in area to said chamber wall and engageable by the liquid in said downstream reach and providing a substantial area transverse to and through the center of which passes the vertical axis of said closing body, said reduced section having a maximum area transverse to said axis substantially less than the transverse areas of said chamber wall and said lower section wall, means bringing said chamber into communication with the liquid in said upstream reach to provide in such chamber a liquid mass having a liquid level conforming to the level of the upstream reach, said lower section being wholly immersed in the liquid of said downstream reach at said given level to control the discharge of the liquid from said passageway into the downstream reach, said intermediate section being partly immersed in the liquid of such downstream reach and being of a height greater than the normal rise and fall of the level of said downstream reach, and said upper section being positioned above the level of said downstream reach and being of such height that the upper end of the liquid chamber thereof and the bottom wall of said chamber will be above and below, respectively, the normal rise and fall of the level of said upstream reach, and means for supplying a force in opposition to a resultant of the hydraulic forces on said transverse walls of said closing body.

References Cited in the file of this patent

UNITED STATES PATENTS

| 1,994,314 | Jermar | Mar. 12, 1935 |
| 2,699,652 | Laszlo | Jan. 18, 1955 |

FOREIGN PATENTS

| 867,866 | France | Sept. 1, 1941 |
| 432,559 | Italy | Mar. 23, 1948 |

UNITED STATES PATENT OFFICE
CERTIFICATE OF CORRECTION

Patent No. 3,070,963　　　　　　　　January 1, 1963

Jacques Dubouchet

It is hereby certified that error appears in the above numbered patent requiring correction and that the said Letters Patent should read as corrected below.

Column 6, lines 23 and 65, after "sections", each occurrence, insert a comma; column 8, line 34, for "top" read -- stop --.

Signed and sealed this 25th day of June 1963.

(SEAL)
Attest:

ERNEST W. SWIDER
Attesting Officer

DAVID L. LADD
Commissioner of Patents